United States Patent [19]

Clavier

[11] 4,383,891
[45] May 17, 1983

[54] DEVICE FOR DESALTING BRACKISH WATER, AND A CONDITIONING METHOD AND DEVICE RELATING TO SAID DESALTING DEVICE

[75] Inventor: Philippe Clavier, Marly Le Roi, France

[73] Assignee: Spie-Batignolles, Puteau, France

[21] Appl. No.: 241,034

[22] Filed: Mar. 6, 1981

Related U.S. Application Data

[63] Continuation-in-part of Ser. No. 70,498, Aug. 28, 1979, Pat. No. 4,292,136.

[51] Int. Cl.³ ............................................. B01D 3/02
[52] U.S. Cl. .................................... 202/234; 159/15; 203/DIG. 1
[58] Field of Search ............ 159/15; 203/10, DIG. 1; 202/234, 232, 233, 235, 163; 126/400, 417; 165/18, 105; 237/1 R, 1 A

[56] References Cited

U.S. PATENT DOCUMENTS

| 2,803,591 | 8/1957 | Coanda et al. ........................ 159/15 |
| 2,820,744 | 1/1958 | Lighter . |
| 3,248,307 | 4/1966 | Walford . |
| 3,314,862 | 4/1967 | Hay . |
| 3,351,536 | 11/1967 | Fox . |
| 3,407,122 | 10/1968 | Dickinson . |
| 3,501,381 | 3/1970 | Delano . |
| 3,653,150 | 4/1972 | Howard . |
| 3,960,668 | 6/1976 | Rush . |
| 4,134,393 | 1/1979 | Stark et al. .................... 203/DIG. 1 |
| 4,135,985 | 1/1979 | LaRocca . |
| 4,141,798 | 2/1979 | Grosse ................................ 202/234 |
| 4,151,046 | 7/1979 | Eidelberg . |
| 4,194,949 | 3/1980 | Stark . |

FOREIGN PATENT DOCUMENTS 921418 1/1947 France .
2208844 6/1974 France .

*Primary Examiner*—Frank Sever
*Attorney, Agent, or Firm*—Fleit, Jacobson & Cohn

[57] ABSTRACT

A device for desalting sea or brackish water by means of solar energy essentially comprises two adjacent canals or equivalent systems fed with seawater or brackish water and a greenhouse-type structure placed over one of the canals for evaporating the water. A fresh-water condensing and collecting structure is adapted to communicate with the greenhouse structure and is largely immersed in the water of the other canal which performs the function of a cold source for the condensing structure.

12 Claims, 21 Drawing Figures

U.S. Patent May 17, 1983 Sheet 1 of 8 4,383,891
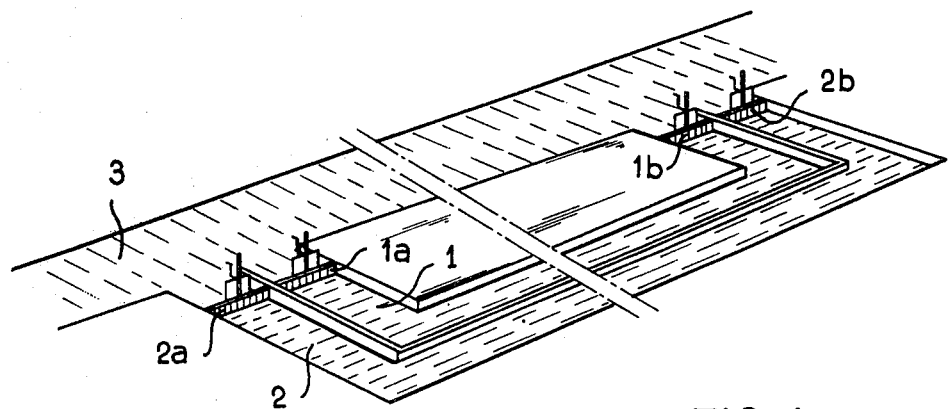
FIG_1
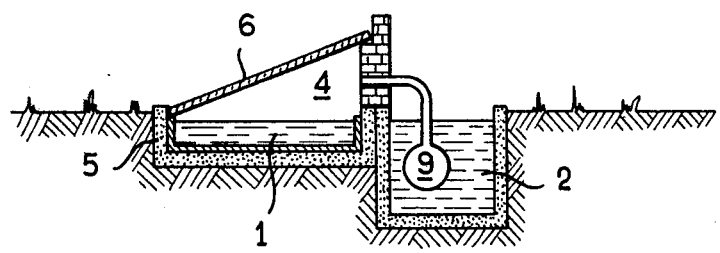
FIG_2
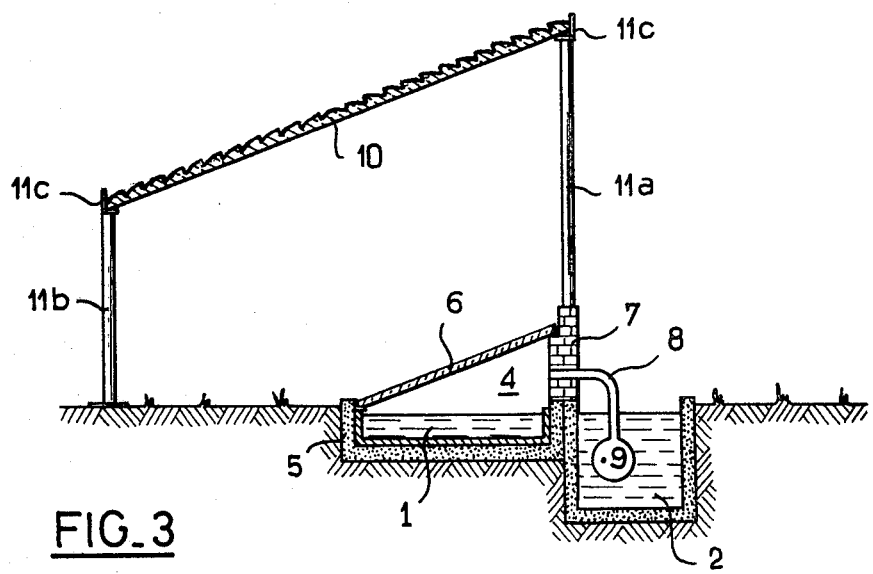
FIG_3

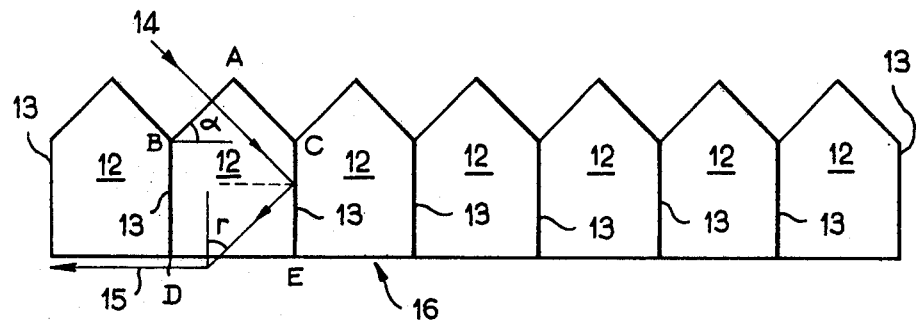
FIG_4
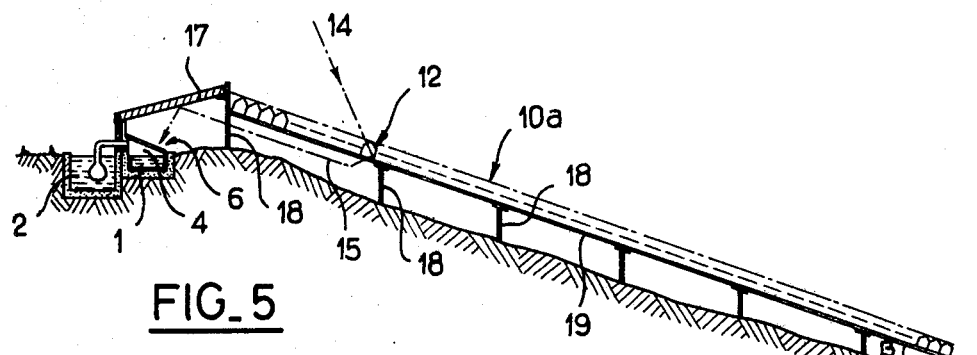
FIG_5
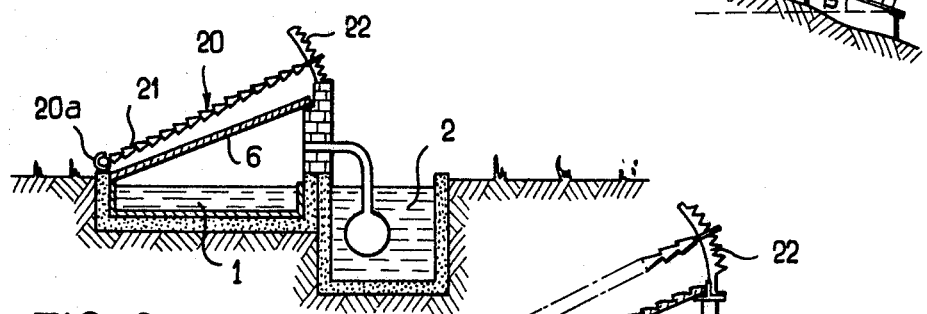
FIG_6
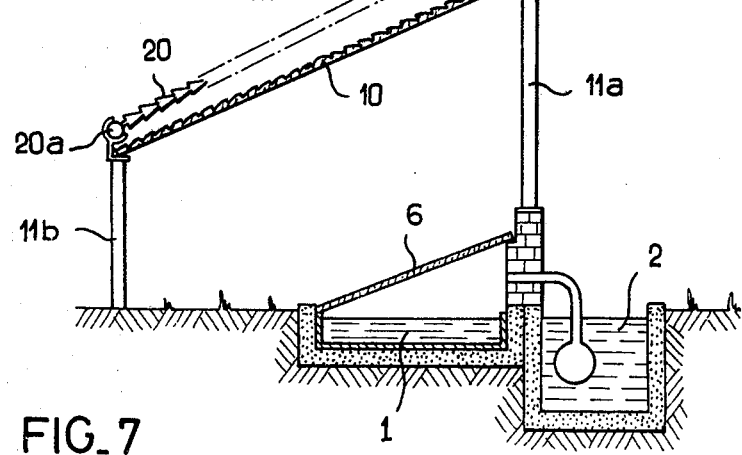
FIG_7

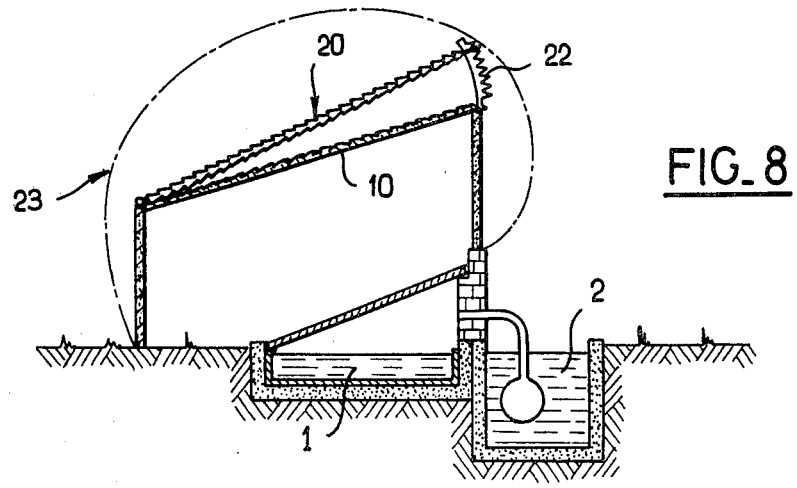
FIG_8
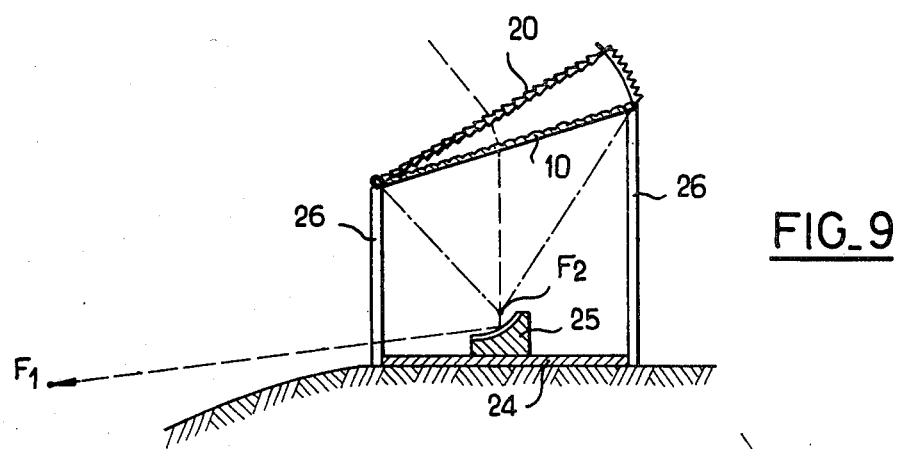
FIG_9
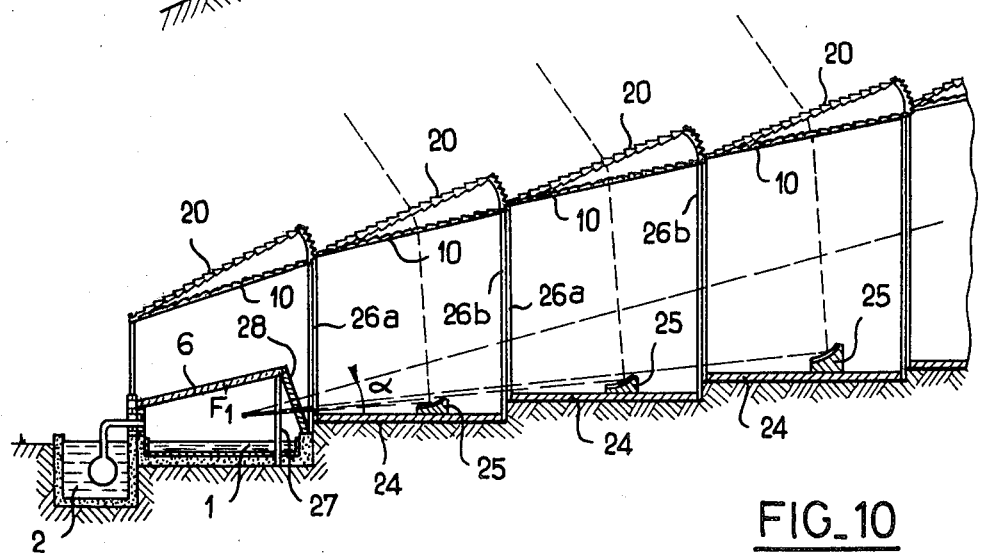
FIG_10

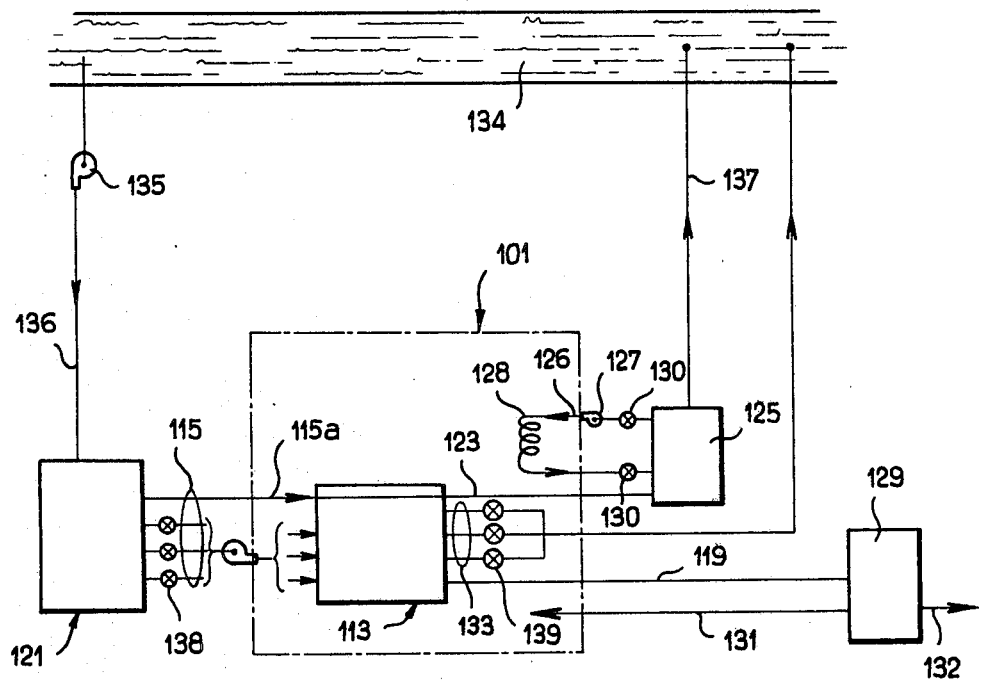
FIG_11
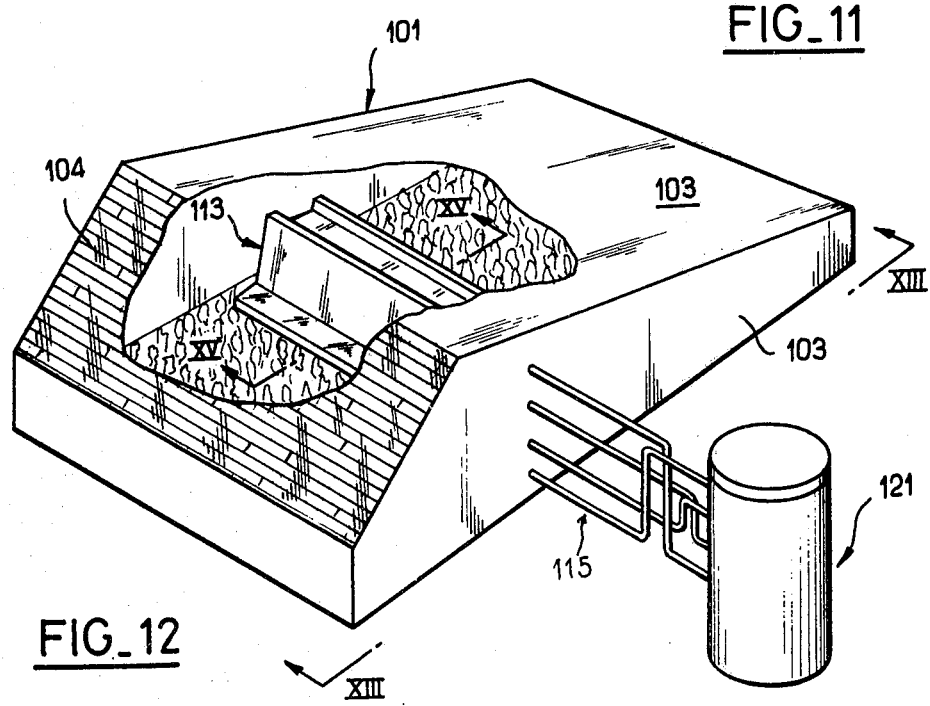
FIG_12

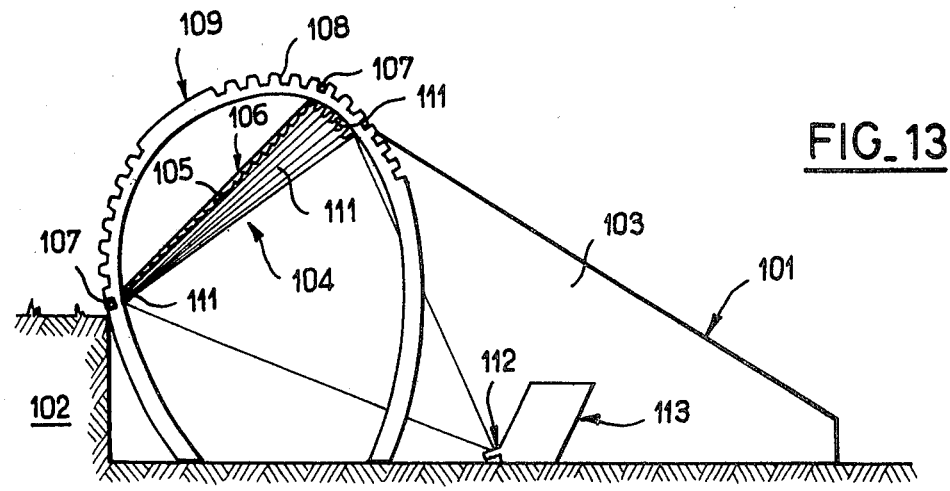
FIG_13
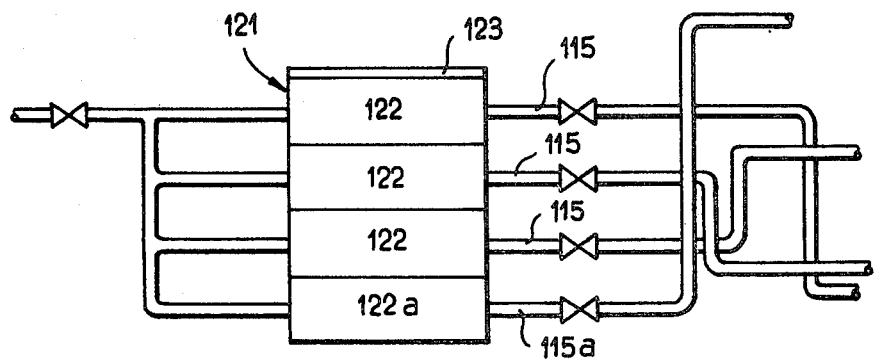
FIG_14
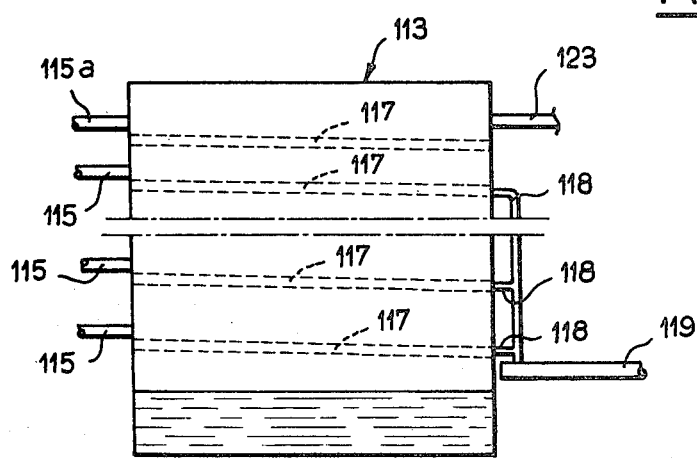
FIG_16

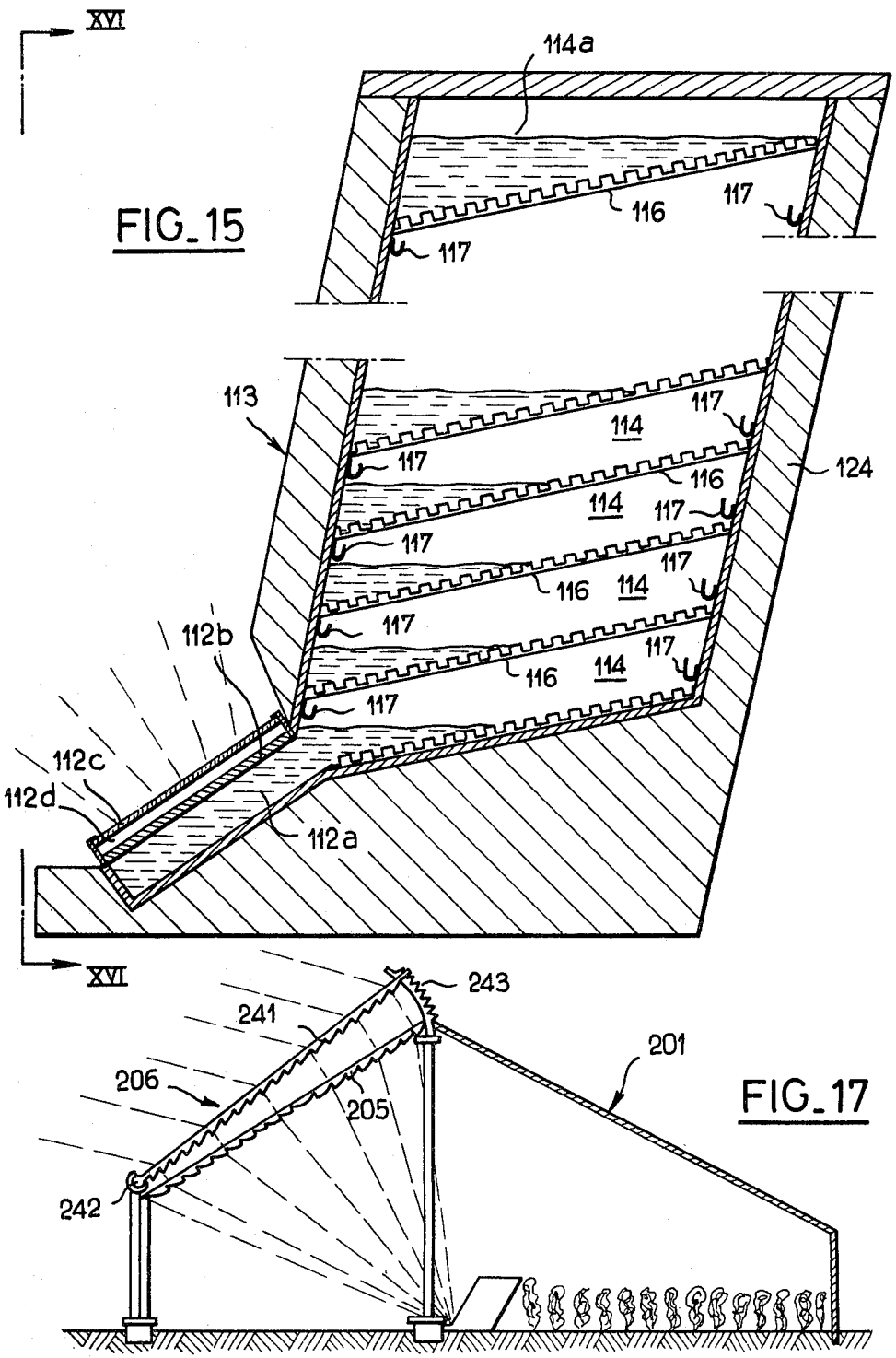

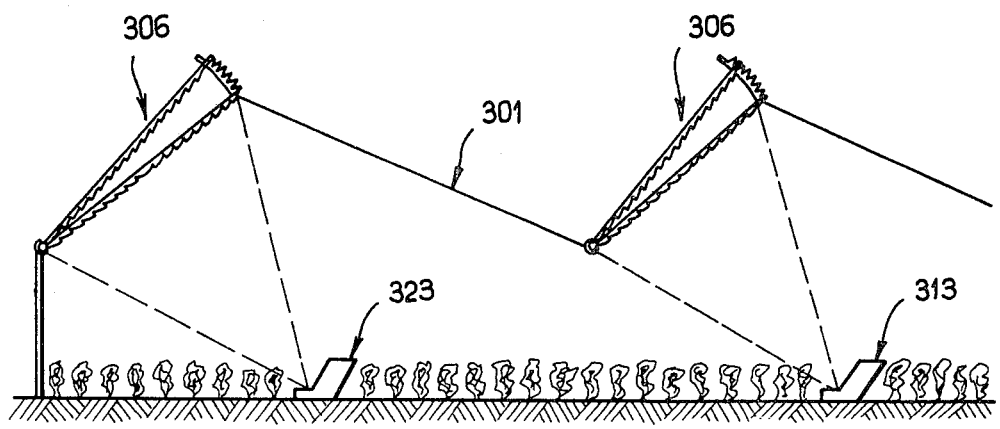
FIG_18
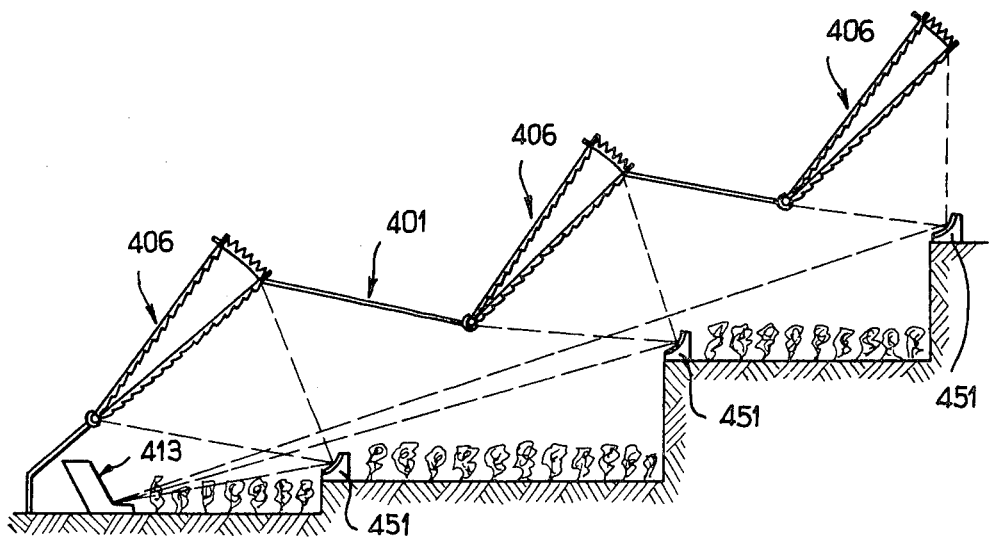
FIG_19

DEVICE FOR DESALTING BRACKISH WATER, AND A CONDITIONING METHOD AND DEVICE RELATING TO SAID DESALTING DEVICE

This application is a continuation-in-part of my application Ser. No. 070,498 filed on Aug. 28th, 1979, now U.S. Pat. No. 4,292,136.

The invention relates to a device for desalting seawater or brackish water using solar energy, as well as to a method and a device for conditioning the atmosphere of a greenhouse in conjunction with said desalting device.

It is known to evaporate brackish water by employing solar radiation with a view to obtaining fresh water, especially for irrigation purposes. To this end, masses of water are exposed to sunshine with or without an optical focusing structure in orde to obtain evaporation. The vapor is retained within the enclosure and condensed on the enclosure walls. The problem of efficient condensation is not satisfactorily solved.

Further problems arise in the particular case in which solar energy is utilized in conjunction with brackish water for the purpose of conditioning premises or a room designated hereinafter as an enclosed area, and especially a greenhouse.

The solar radiation admitted into the greenhouse must in fact be sufficient to cause evaporation which in turn produces a suitable degree of atmospheric humidity and a quantity of condensed fresh water which is sufficient for irrigation of the soil. But the heat thus introduced into the greenhouse is the cause of a temperature rise which often proves unacceptable. Correlatively, in areas in which solar energy is utilized, the greenhouse must be protected against low night temperatures.

A first aim of the invention is to provide a device for desalting brackish water, especially in which recondensation of evaporated water is carried out both economically and efficiently and makes it possible to obtain high yields of fresh water.

A further aim of the invention is to provide a method and a device for conditioning the atmosphere of an enclosed area in such a manner as to secure the advantages mentioned in the foregoing.

According to a first aspect of the invention, the device for desalting sea or brackish water by means of solar energy essentially comprises two adjacent canals or equivalent systems fed with seawater or brackish water, a greenhouse-type structure placed over one of said canals for evaporating the water, and a fresh-water condensing and collecting structure adapted to communicate with said greenhouse structure and mainly immersed in the water of the other canal which performs the function of a cold source for said condensing structure.

Preferably, a structure for optical focusing of solar radiation is associated with the greenhouse structure and can form different embodiments which are both simple and effective as will become apparent hereinafter.

It is necessary to permit both trapping and renewal of the sea or brackish water of at least the evaporation canal. Thus a device for desalting water according to the invention will also preferably include another canal or equivalent structure running parallel to the canals mentioned above and used for feeding said canals with seawater or brackish water. The aforesaid trapping and renewing means will in this case consist of sluices for establishing a communication between each canal and the aforementioned feeder canal.

It is already a known fact that seawater contains approximately 4.5 % by weight of salt (density 1.03) but could contain up to 26 % before being saturated. It is thus possible to obtain fresh water by evaporation of seawater without any attendant formation of salt deposits as long as the seawater employed is renewed before its salinity exceeds the critical value. It must nevertheless be ensured that the temperature maintained within the evaporation canal is sufficient to obtain a useful partial vapor pressure. By reason of the fact that the available solar energy is limited, the quantity of sea or brackish water to be processed must not exceed requirements. It is for this reason that periodic trapping and renewing of water are necessary in order to achieve a higher yield.

The cold source provided by the second canal mentioned above is simply the consequence both of natural evaporation of the seawater which acts as a regulator and also of re-radiation at night.

According to a second aspect of the invention, the method for conditioning the atmosphere of an enclosed area and especially a greenhouse utilizes solar energy and essentially consists in focusing the sun's rays on a mass of water located within the enclosed area so as to cause at least partial evaporation of the water and in passing through the enclosed area a predetermined flow of water which is subjected to focused solar radiation in order to remove from the enclosed area part of the heat generated within said area by the solar radition.

It is thus found possible to reconcile two objectives which are usually contradictory:

that of obtaining the desired output of fresh water;
that of obtaining within the enclosed area a desired temperature which is unrelated to the aforementioned flow of water.

Preferably, the reheated water which has been removed from the enclosed area is then circulated within said area during the night in order to compensate for the effects of low night temperatures. Provision is advantageously made for an optical focusing structure on one face of the enclosed area which is oriented in the direction of maximum height of the sun during the daytime and the angle of slope of said structure is varied according to the seasons of the year.

If no allowance is made for diurnal variations of inclinations of the sun but only for seasonal variations, the mechanism for producing a displacement of said structure is considerably simplified.

According to a third aspect of the invention, the device for conditioning the atmosphere of an enclosed area and especially a greenhouse comprises at least one optical structure which serves to focus solar energy and is placed on one enclosed-area face which is exposed to the sun, an enclosure for containing a mass of water located within the solar-radiation focusing zone, and means for circulating a flow of coolant water which passes through the focusing zone and is discharged to the exterior of the enclosed area.

These and other features of the invention will be more apparent upon consideration of the following description and accompanying drawings, wherein:

FIG. 1 is a perspective view showing the layout for the two canals of the device placed along a feeder canal;

FIG. 2 is a transverse sectional view of the two canals equipped to provide the desalting action according to the invention;

FIG. 3 is a transverse sectional view of an alternative embodiment of the aforesaid device, which increases the output;

FIG. 4 is a transverse sectional view of a panel made up of prisms for focusing the sun's rays;

FIG. 5 is a transverse sectional view of a desalting device provided with a solar energy focusing structure which makes use of panels such as those shown in FIG. 4;

FIG. 6 is a transverse sectional view of an alternative embodiment of a device of the type shown in FIG. 2;

FIG. 7 is a transverse sectional view of another alternative embodiment of a device of the type shown in FIG. 3;

FIG. 8 is a transverse sectional view showing a variant of the preceding embodiment;

FIG. 9 is a transverse sectional view of another structure for focusing solar energy;

FIG. 10 is a transverse sectional view of a desalting device which makes use of structures of the type shown in FIG. 9;

FIG. 11 is a general arrangement diagram showing the circulation of the water within a device for conditioning the atmosphere of a greenhouse according to the invention;

FIG. 12 is a general view in perspective showing a greenhouse equipped with a device of this type;

FIG. 13 is a sectional view taken along line XIII—XIII of FIG. 12;

FIG. 14 is a view in elevation of the reservoir for the storage of brackish water;

FIG. 15 is a sectional view taken along line XV—XV of FIG. 12 and showing the evaporator;

FIG. 16 is a view taken along line XVI—XVI of FIG. 15 and showing the evaporator;

FIGS. 17 to 19 illustrate alternative embodiments of the device for focusing solar radiation;

Figure 20:
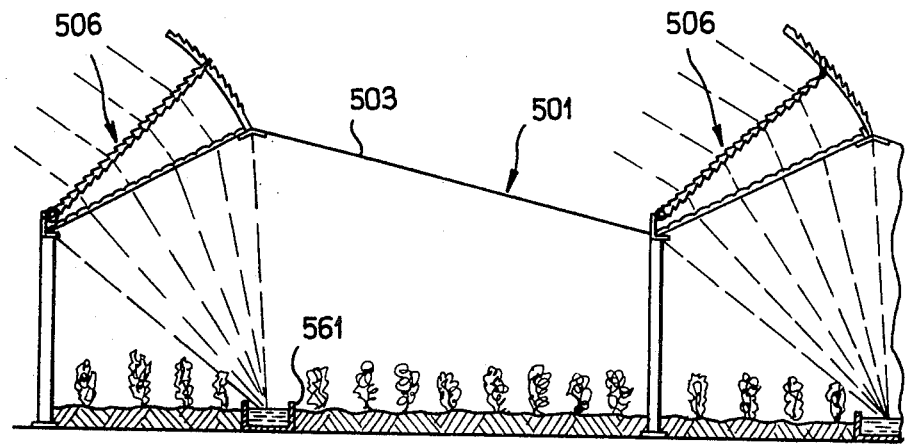
FIGS. 20 and 21 illustrate alternative embodiments of the conditioning device.
Figure 21:
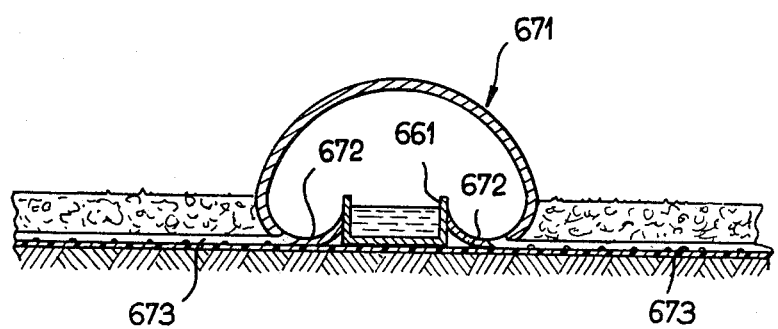

The canal layout of a desalting device shown in FIG. 1 makes provision for two canals 1 and 2 linked by ordinary manually operated sluices 1a, 1b, 2a, 2b, to a canal 3 or to a pipe fed with seawater or brackish water. The pressure drop along the canal 3 should be sufficient to cause seawater to flow along the canals 1 and 2 simply by opening the head sluices 1a and 1b and the foot sluices 2a and 2b. Closing of these sluices has the effect of trapping the water within both canals 1 and 2.

The canal 1 is intended to be the heat source or water evaporation canal whereas the canal 2 is intended to be the cold source for a structure on which fresh water evaporated from the canal 1 is to be condensed.

As shown in FIG. 2, the bottom and sides of the canal 1 are provided with a radiation-absorbent coating (for instance a coat of black paint). The canal is embedded in a refractory layer made for instance of sand or bricks.

The canal is enclosed and topped by a transparent pane 6 of glass, for instance, and placed slantwise either in order to ensure that the surface of said pane is orthogonal on the average to the sun's rays at noon (the angle of slant of the pane varies with the latitude) or in order to satisfy other conditions mentioned later.

A wall 7 which supports the higher end of the pane 6 is made of refractory material (such as bricks).

The general arrangement described thus far constitutes a greenhouse structure over the canal 1.

The wall 7 is pierced with holes for pipes 8 which connect the canal 1 to a pipe 9 placed within the canal 2 (for instance at the bottom) so as to form a condensation structure. The condensed fresh water is capable of flowing within the pipe 9 under the action of gravity to a storage tank (not shown) and of accumulating within this latter or alternatively of flowing through said pipe to a series of smaller storage tanks which are placed at intervals along its length and are capable, for example, of performing the function of constant level tanks at the head of underground irrigation ducts, in accordance with arrangements provided in particular in the process designated as BIP by the French Company known as Bertin.

The canal 2 has an open top so that the seawater contained therein remains at a temperature defined by the ambient temperature and the evaporation which it produces. The canal capacity can be chosen so as to minimize the water temperature under the environmental conditions which are encountered. If so desired, the wall 7 can be fitted with any additional screen in order to protect the canal 2 against the sun's rays.

A plant of this type makes it possible to obtain 3 cubic meters of fresh water per day and per kilometer of canal in the case of a canal 1 having a width of 1 meter. As a basis of reference in the field of agricultural irrigation, 1 liter/second/hectare per sunshine hour is required for flood irrigation, namely about 2 liters/day/m$^2$. A more up-to-date sprinkler irrigation system (such as the BIP process mentioned earlier, for example) makes it necessary to employ only 30 % of this quantity, namely 0.6 liter/day/m$^2$. The device herein described accordingly permits irrigation of 5 m$^2$ per meter of canal. The device would also be capable of meeting the fresh water requirements of one person per meter of canal.

A method adopted with a view to obtaining better results consists in focusing solar energy. FIG. 3 shows the system of FIG. 2 to which there has been added a solar energy focusing device fabricated from panels 10 of transparent material each having a molded external face (or internal face or even both faces) so as to form a Fresnel lens which focuses the sun's energy inside the greenhouse 4.

Panels of this type can be made from plastics, for instance from methacrylic resins, and formed into a cylindrical Fresnel lens by molding. The grooves providing the lens effect extend horizontally in a direction parallel to the canal 1. The slope given to the panels 10 is the same as the slope given to the panes 6. It will thus be ensured that the annual mean direction of the sun's rays at noon will be at right angles to the panels 10. During the daytime the sun's rays will remain more or less within a plane at right angles both to the panels 10 and to the vertical cross-section of the canals 1 and 2. In this manner, focusing of the rays will continue to take place within the greenhouse 4.

By reason of the fact that the distance between a panel 10 and a greenhouse 4 must be of the same order as the width of said panel 10 (which is the distance AB), the height of the structure supporting the panel 10 may become substantial, even though said support structure may be limited in principle to posts 11a, 11b braced by cross-members in the form of L-section bars 11c on which the panels are brought to bear.

The wall 7a between the two canals can be made higher, however, so that its shadow may thus protect the canal 2 from the sun.

At night, it is advisable to unroll or place screens, awnings or any kind of protective sheet such as a tarpaulin above the panes 6 in order to minimize losses by radiation within the greenhouse. This could also be done in the case of FIG. 2.

A device of the type shown in FIG. 3 permits irrigation of 25 m² per meter of canal (assuming that the canal 1 has a width of 1 meter) or makes it possible to satisfy the fresh-water requirements of four to five persons per meter of canal.

There is shown in FIG. 4 another device for focusing solar energy which is of greater capacity. This device is also constructed in the form of panels. Each panel is made up of elongated cells 12 as shown in cross-section in FIG. 4 and the vertical walls 13 of said panels are metallized (made reflecting). The sun's rays at noon enter the transparent material of each cell at right angles to the face BA. The face AC is at right angles to the face BA so that it cannot interfere with the sun's rays which strike the next cell. The angle $\alpha$ made by the face BA with the horizontal line BC is chosen so that the sun's rays 14 are refracted for the most part at the face DE, along that face. Thus the angle r must therefore correspond substantially to the Brewster conditions, which means that, if n is the refractive index of the cell material, $\alpha = \arcsin(1/n)$. Since the refractive indices vary only to a slight extent (between 1.4 and 1.6), it is apparent that $\alpha$ is of the order of 45° (which is the correct value when $n = 1.414$).

Panels of this type consequently bend part of the solar energy in a given direction 15 along their bottom surface 16.

FIG. 5 corresponds to a layout of a desalting device which employs the solar focusing means shown in FIG. 4.

After passing through the cells 12, the solar rays such as the ray 14 are bent in a direction parallel to the bottom face of the panels 10a. Said rays then impinge upon a reflecting roof (mirror) 17 and enter the canal 1 through the pane 6.

The solar focusing device is supported above ground by a very light structure comprising poles 19 interconnected by beams 19 which remain in the plane of the figure, thus avoiding the presence of beams parallel to the canals, which would intercept the rays bent as indicated.

The angle of slope $\beta$ is chosen so as to ensure that the solar rays are at right angles to the incident faces of the cells when the sun is at the zenith. The slope would be zero in the case of rays which are inclined to the horizontal at an angle of 45°; the angle of slope is 15° in the case of rays inclined to the horizontal at 60°, and is 25° in the case of rays inclined to the horizontal at 70°.

Refractory material 20 is placed behind the mirror 17 in order to form a screen and thus protect the greenhouse against radiation losses within the canal 1 during the night.

Another solution for focusing solar energy as shown in FIG. 6 consists in compensating for the annual variation in the sun's altitude by means of a screen 20 formed of prisms 21. By following a precise calendar schedule, one can either change screens such as the screen 20 or in other words make use of screens consisting of prisms having different apex angles, or adjust the angle of slope of the screen. To this end, arcuate mounts 22 can be attached to the wall 7 and provided with notches in which the screen can be engaged according to the desired angle of slope, said screens being pivotally mounted at 20a. The number of operations involving changes of screens or changes of screen angles in the course of a year can be computed, taking into account the losses through the screen and the losses through the pane 6 when the solar rays do not strike the screen at right angles. Such screens can be formed by molding from plastic material and the same applies to the panels 10 which perform the function of a Fresnel lens.

Arrangements can be made to support and maintain the screens in position by means of a frame which endows them with the necessary mechanical properties.

As shown in FIG. 7, a screen 20 of this type can also be used in conjunction with a panel 10 having the function of a Fresnel lens (mounted as shown in FIG. 3) so that the sun's rays will continue to strike the panel 10 at right angles throughout the year.

In both the cases of FIG. 6 and FIG. 7, the angle of slope of the pane 6 and/or of the panel 10 which constitutes a Fresnel lens will be chosen so as to ensure that the sun's rays at noon, on the longest day of the year, will be at right angles to the pane 6 and/or to the panel 10; at that time, it will be necessary to remove the screen 20. During the rest of the year, when the sun at noon is lower in the sky, the screen will be used and placed at an angle of slope which will always be larger than the angle given to the pane 6 or the panel 10.

FIG. 8 relates to a solution of the same type as the embodiment of FIG. 7 but differs from this latter in size, particularly insofar as the width of the panel 10 which constitutes a Fresnel lens is, for example, only twice the width of the pane 6. It is accordingly proposed in this case that, instead of erecting wood frames or even walls, the overall optical structure (by which is meant the panel 10 and its support) can form a kind of casing 23 which can be transported either as a kit or pre-assembled. Thus, in the case of a canal having a width of 50 cm, for instance, the dimensions of the casing will be of the order of one meter.

A reduction in size of the panel 10 which forms a Fresnel lens can also lead to another device for focusing solar energy as shown in FIG. 9. This casing is such that its dimensions can also be of the order of one meter, for example, and includes a floor 24 on which is mounted an elliptic mirror 25. Thus the solar energy focused at F2 by the panel 10 acting as a Fresnel lens and by the screen 20 is reflected from said elliptic mirror and refocused to a further focal point F1.

Whereas the faces of the casing parallel to the plane of the figure can be full, the faces located at right angles to the plane of the figure (at least the face directed towards the focal point F1) must be hollow so that the upright members designated by the references 26a, 26b usually consist of posts.

In the case of a device of this type, a certain degree of accuracy is necessary and the screen 20 must accordingly be considered as an essential element in order to ensure useful operation of the device throughout the year. In the event that the focal point F1 is intended to be located beneath the pane 6 within the canal 1, its position can have dimensional variations of the order of 50 cm which, over a range of 20 meters, results in a possible angular tolerance of less than 2°.

As shown in FIG. 10, a number of casings of the type shown in FIG. 9 can accordingly be employed for the purpose of focusing the solar energy collected over a very large surface area to a point F1 which is located within the canal 1 beneath the pane 6. The shape of the roof of the greenhouse over the canal 1 is somewhat modified to permit entry of the sun's rays collected by the casings. Thus the poles 27 which support the pane 6 at intervals and are interconnected at their upper ends also support another substantially vertical transparent pane 28. Furthermore, the casings for focusing solar energy are placed in such a manner as to ensure that no casing obstructs rays which emanate from casings that are further away.

The necessary precision for the device can be obtained at the factory before transportation to the site location. To this end, the upright members 26a, 26b of adjacent casings will be provided with notches or holes for screws or with any other means such that it would prove impossible to place the casings in relative positions which are different from the intended arrangement.

The angle $\alpha$ for the rays entering the canal 1 can be of the order of 20° and the number of casings which can be placed along a direction at right angles to the canal, although limited, may easily reach 20.

Referring now to FIGS. 11 to 21, a similar device for desalting brackish water will now be described, the desalting device being employed in conjunction with a device for conditioning an enclosed area such as a greenhouse.

A greenhouse 101 (as shown in FIGS. 12 and 13) is partially buried in the ground 102 and the side walls 103 of said greenhouse are partly or wholly constituted by transparent walls. One side wall 104 is oriented in the direction of maximum height of the sun during the daytime at the geographic location considered, namely towards the south in the northern hemisphere and towards the north in the southern hemisphere.

Said wall 104 comprises an optical focusing structure 106 formed by a cylindrical Fresnel lens 105 in order to focus the solar radiation at a point within the greenhouse which will be defined hereinafter.

In order to take into account the variations in said maximum height during the year, the structure 106 is adjustable. To this end, said structure is fixed on two bars 107 which extend in the east-west direction and the ends of which are adapted to engage in notches 108 of curved supports 109. It is apparent that, by making a suitable choice of notches 108, the orientation of the structure 106 can be varied within the limits corresponding to the variations in maximum height of the sun during the year.

In order to close the greenhouse 101 while taking into account the mobility of the structure 106, the four sides of the lens 105 are attached to the greenhouse 101 by means of bellows seals 111.

The above-mentioned point of convergence of the solar radiation is a target 112 located at the base of an evaporator 113 (as shown in FIGS. 15 and 16). Said evaporator has a certain number of compartments 114 which are placed in superposed relation and to which a predetermined quantity of water is intended to be supplied by means of pipes 115 at the beginning of the day. The compartments 114 are separated from each other by plates 116 which are grooved in order to improve heat transmission caused by condensation from one stage to the next. Said compartments are downwardly inclined towards that wall of the evaporator which is located nearest the target 112 (as shown in FIG. 15).

A bottom compartment is provided with an extension 112a covered with an absorbent plate 112b so as to constitute the target 112. Moreover, the plate 112b is surmounted by a pane 112c in which is trapped an air layer 112d.

Within each compartment, a gutter 117 is placed around the periphery of each compartment in order to receive the condensed water formed on the compartment walls. Said gutters are connected to discharge pipes 118 which are gathered into a single discharge manifold 119. In order to obtain satisfactory removal of condensates, the plates 116 and the gutter 117 are downwardly inclined towards the evaporator wall nearest the point of connection of the pipes 118 (as shown in FIG. 16).

The pipes 115 which feed the compartments 114 are connected to a tank 121 for the storage of brackish water (as shown in FIGS. 11, 12, 14). Said storage tank is exposed to the sun and is divided into a predetermined number of compartments 122 arranged in superposed tiers. The top portion of the storage tank is covered with a removable transparent sheet 123 which can be replaced at night by an opaque sheet. It is understood that, under these conditions, the temperature of the water stored within the successive compartments will progressively decrease from the top to the bottom compartment. The layout of the pipes 115 is such that the water flows from the bottom compartments 122 of the storage tank 121 to the top compartments 114 of the evaporator 113.

In particular, the bottom compartment 112a which contains water at the lowest temperature is connected to the single top compartment 114a of the evaporator 113.

The operation of the evaporator 113 in conjunction with the feed system will now be explained. It will be assumed that the brackish water has been stored during an entire day within the storage tank 121 and has been subjected to differential heating as indicated in the foregoing. During the following night, the brackish water has been protected against cooling during the night by means of the opaque sheet.

The following morning, the compartments 114 of the evaporator are filled with a predetermined quantity of water corresponding substantially to the quantity which may be evaporated during the day.

The bottom compartment which is adjacent to the target 112 is heated to a relatively high temperature. The water contained therein evaporates and condenses on the plate 116 which is placed above said bottom compartment and which is heated to a lower temperature, and yields its heat of condensation to said plate, thus heating the compartment located directly above. The temperatures within the evaporator therefore decrease from the bottom upwards in a stepped sequence.

The evaporator 113 as a whole is naturally surrounded by a heat-insulating packing 124, with the exception of the target 112.

The water within the top compartment 114a is not stagnant. On the contrary, a stream of cold brackish water which flows upwards from the bottom compartment 122a of the storage tank 119 is circulated continuously through the top compartment prior to discharge via a pipe 123.

The presence of the differential-heating storage tank 121 therefore makes it possible to preheat the water to be evaporated in a stepped temperature sequence corresponding approximately to the sequence within the evaporator.

The pipe 123 for the discharge of brackish water which serves to cool the evaporator is connected to a tank 125 for the storage of reheated brackish water, this tank being of a standard type and shown diagrammatically in FIG. 11. A closed-circuit pipe 126 is connected to said storage tank 125 and fitted with a pump 127 for supplying a circuit 128 which serves to heat the greenhouse 101 and can be either isolated or put into service by means of cocks 130.

The fresh-water discharge pipe 119 is connected to a storage tank 129 of standard type (as shown in FIG. 11) from which extend a pipe 131 for sprinkling the soil of the greenhouse and a pipe 132 for normal water consumption.

Provision is also made for pipes 133 (shown in FIG. 11) which are connected in each case to one compartment 114 of the evaporator 113 and serve to discharge the rinsing water employed for the removal of salt deposits after evaporation.

Referring mainly to the diagram of FIG. 11, the general operation of the installation described in the foregoing will now be explained.

A reserve supply of brackish water is provided by a watercourse 134. In the early morning, brackish water is drawn from said watercourse by means of a pump 135 in order to fill the brackish-water storage tank 121 by means of a pipe 136.

After a full day of exposure to sunshine beneath the transparent sheet 123, the water has heated differentially within the different compartments 122 of the storage tank. Said tank is then covered with an opaque sheet in order to prevent cooling during the night.

The following morning, the brackish water is transferred from the compartments 122 of the storage tank 121 into the compartments 114 of the evaporator 113, each compartment 114 being intended to receive the quantity of water which is intended to evaporate during the daytime. The tank 121 is then re-filled with brackish water in order to prepare the cycle for the following day.

The water which lies stagnant throughout the daytime within the compartments 114 evaporates under the action of the solar radiation which is focused by the structure 106 onto the target 112 and is then recondensed under the action of the cold source constituted by the stream of brackish water which flows continuously through the top compartment 114a.

This stream of brackish water is thus reheated, then stored in the tank 125 in order to reheat the surrounding atmosphere of the greenhouse during the following night by means of the circuit 128. At the end of the night, the water is discharged into the watercourse 134 through a pipe 137.

Fresh water is continuously collected by means of the pipe 119, stored within the tank 129, then recirculated via the pipe 131 for irrigation of the greenhouse or via the pipe 132 for any other purpose.

At the end of the day, the compartments 114 of the evaporator 113 practically contain nothing except salt. A certain quantity of water is drawn from the storage tank 121 and injected into said compartments in order to driveout the salt by flushing, the product of this flushing operation being discharged to the watercourse 134 via the pipes 133.

The invention therefore makes it possible to carry out both the production of fresh water and climate control of the greenhouse. In fact, the greenhouse walls 103 are protected against direct radiation of the sun. In regard to the heat introduced as a result of direct radiation of the sun, this heat is partly or wholly removed by the stream of water which flows through the compartment 114a. The degree of humidity is controlled by setting the irrigation flow rate at the requisite value.

These results are obtained with a remarkable economy of means. In fact, although pumps have been mentioned in the foregoing, it is endeavored to ensure that water circulates in particular under the action of gravity. Similarly, valve equipment is minimized and need consist only of valves 138 on the feed side of the evaporator and of valves 139 in the flushing-out pipes 133.

Furthermore, the orientation of the optical focusing structure 106 remains unchanged during the daytime since the target 112 should be of sufficiently large area to receive the focused energy at all hours. Although this is attended by slight imperfection in the collection of solar rays, the economy thus achieved in capital cost and labor is substantial. It is only at different seasons and over fairly long time intervals that this orientation is modified as a function of variations in height of the sun.

A numerical example of the method will now follow. The numerical data given hereinafter relate to 1 square meter of collected solar radiation.

The thermal power collected over an area of 1 square meter is 800 watts. Postulating a mean daily efficiency of 84% in the case of the optical focusing device (which does not follow the sun in its height variations), approximately 675 W remain available on the target.

In practice, the heat-absorbing surface of the target is covered with a glass plate which provides an air layer in order to prevent losses by convection. This results in losses by conduction of approximately 175 W. The useful power which therefore remains is 500 W corresponding to an energy of $14.4 \times 10^6$ joules during eight hours of daylight.

This energy serves to heat and evaporate the water within the evaporator 113. Assuming that the evaporator has seven evaporation compartments 114, that the water within the target is heated to 90° C. and that the coolant water is at a temperature of 20° C., the rate at which fresh water is produced by condensation is 25 liters per day.

It is usually acknowledged that indoor cultivation calls for irrigation of 0.6 liter per day and per square meter of cultivated ground area. If the entire quantity of fresh water produced is employed for irrigation purposes, it is therefore possible to cultivate 42 square meters per square meter of collected solar radiation, which is considerable. It will therefore be possible in many cases to employ part of the fresh water for other purposes.

The walls 103 of the greenhouse are not exposed to direct solar radiation, with the result that the temperature remains at a moderate value of the order of 30° C. Should this temperature tend to rise, it would only be necessary to increase the rate of flow of cold water through the greenhouse in order to remove the excess thermal energy, this being achieved by employing the closed circuit 128, for example.

The thermal energy of $14.4 \times 10^6$ joules extracted by the cold water stream of the evaporator is stored in the form of hot water within the tank 125.

Calculation shows that, in the case of a sevenstage evaporator, the quantity of coolant water which is necessary for a period of eight hours is approximately 100 cubic meters. Such a quantity can readily be stored and the water is in fact at a temperature of 30° C.

Recirculation of the water during the night hours (14 hours, for example) makes it possible to heat the air from 10° C. to 20° C., thus effectively compensating for cooling during the night.

As described earlier and as shown in FIG. 17, an alternative form of construction of the focusing structure 206 may be devised. Thus a stationary lens 205 is associated with a system of prisms 241 which is capable of displacement about a pivot 242 and can be adjusted by means of a toothed rack 243 in order to carry out a variable deviation of the solar radiation, depending on the season. This structure is more costly but avoids the use of bellows elements.

If the greenhouse 301 is intended to have very substantial ground dimensions, provision can accordingly be made for a number of focusing structures 306 (as shown in FIG. 18), each structure being adapted to cooperate with an evaporator 319.

In accordance with an arrangement contemplated in the foregoing, each focusing structure 406 can be adapted to cooperate with a common evaporator 413 by causing all the rays focused by means of mirrors 451 to converge towards a single evaporator 413.

The method according to the invention can also be carried into practice by means of simplified devices.

Referring to FIG. 20, a greenhouse 501 comprises a certain number of focusing structures 506 which are similar to those described in the foregoing and serve to focus the solar radiation on a corresponding number of open canals 561 in which a stream of brackish water circulates. The evaporation produced within the canals has the effect of humidifying the atmosphere of the greenhouse. The soil is accordingly humidified partly by hygroscopy from the moist atmosphere and partly by water in the liquid state resulting from recondensation on the greenhouse walls 503 which are not directly exposed to solar radiation.

In a more highly improved embodiment (shown in FIG. 21), a transparent sheath 671 is arranged above the canal 661 and forms two lateral canals 672 for collecting the fresh water which has recondensed on the internal wall of the sheath. Underground ducts 673 distribute this water for the purpose of irrigation of the greenhouse.

In these simplified embodiments, no provision is made for collecting fresh water for general use.

Conversely, the embodiments described in the foregoing are not solely applicable to greenhouses but can serve to condition all types of enclosed areas, premises or rooms and especially workshops while at the same time providing a supply of fresh water.

What is claimed is:

1. Apparatus comprising means for decreasing the rate of temperature increase in an enclosed space while obtaining purified water from brackish water including:
   wall means for defining an eclosed space;
   optical means for intercepting solar energy impacting on a portion of said wall means and for focusing the intercepted solar energy in a focused region within the enclosed space so as to prevent uncontrolled heating of the enclosed space by the intercepted solar energy;
   an enclosure totally encompassed within the enclosed space and containing brackish water, a portion of the brackish water lying in the focused region so that the energy of the intercepted solar energy is imparted to and heats the brackish water to cause evaporation therefrom;
   heat extracting means within said enclosure for contacting and condensing evaporated water;
   collecting means for collecting condensed water and for removing the condensed water from said enclosure; and
   means for circulating coolant liquid from a source exterior of said enclosed space through said enclosure in heat exchange relationship with said heat extracting means and for discharging the coolant liquid to the exterior of the enclosed space so that the coolant liquid is heated during its passage through the enclosure to thereby enhance condensation of the evaporated water and remove the energy of the intercepted solar energy and transfer same to the exterior of the enclosed space.

2. An apparatus according to claim 1, wherein said apparatus comprises means exterior of said enclosed space for storing the heated coolant liquid after discharge from the enclosed space, means for re-circulating said heated coolant liquid in a closed circuit within the enclosed space, and a system of switching valves for opening said re-circulating means.

3. An apparatus according to claim 2 or 1, wherein the wall means includes a wall forming said optical means, said wall forming an optical focusing structure orientable in the direction of maximum height of the sun during the daytime.

4. An apparatus according to claim 3, wherein the optical means comprises a system of prisms, and adjusting means for varying the angle of slope of said system with respect to the horizontal.

5. An apparatus according to claim 1, wherein the optical means comprises a Fresnel lens.

6. An apparatus according to claim 5, wherein a system of prisms is placed in front of the Fresnel lens.

7. An apparatus according to claim 1, wherein said apparatus comprises a predetermined number of optical focusing structures, each structure being equipped with a mirror located at the focal point and oriented so as to deviate the focused energy towards the enclosure which contains the mass of brackish water.

8. An apparatus according to claim 1, wherein the enclosure containing the brackish water comprises an evaporation enclosure having a predetermined number of compartments placed one above the other and each intended to contain a predetermined quantity of brackish water, the bottom compartment being located so as to receive the focused solar energy, a circulation canal for the coolant liquid being located in the top compartment, said means for circulating including means for providing a separate supply of brackish water to each compartment, said heat extracting means including condensation means for condensing the evaporated water within each compartment, and said collecting means including means for collecting and discharging the condensed water to a fresh water storage tank.

9. An apparatus according to claim 8, wherein a brackish water storage enclosure exterior of said enclosed space is provided for supplying the enclosure and comprises at least two compartments, and wherein one of said compartments is exposed to solar radiation and connected to lower compartments of said enclosure whilst another of said compartments is not exposed to solar radiation and connected to upper compartments of said evaporation enclosure.

10. An apparatus according to claim 9, wherein the storage enclosure is provided with a removable opaque sheet.

11. An apparatus according to claim 8, wherein the fresh water storage tank is connected to a canal system for irrigating the soil of the enclosed area.

12. An apparatus according to claim 1, wherein said apparatus comprises a predetermined number of optical focusing structures, each structure being equipped with an elliptic mirror, one focus of which being located at a focal point of said focusing structure, and the other focus of which being located in the area of said enclosure containing the brackish water.

* * * * *

UNITED STATES PATENT AND TRADEMARK OFFICE
CERTIFICATE OF CORRECTION

PATENT NO. : 4,383,891
DATED : May 17, 1983
INVENTOR(S) : Philippe Clavier

It is certified that error appears in the above-identified patent and that said Letters Patent is hereby corrected as shown below:

On the title page assignee should read

-- (73) Assignee: Spie-Batignolles, Puteau, France, a part interest --.

Signed and Sealed this

Fourteenth Day of August 1984

[SEAL]

Attest:

Attesting Officer

GERALD J. MOSSINGHOFF

Commissioner of Patents and Trademarks